United States Patent [19]
Knothe et al.

[11] 3,747,390
[45] July 24, 1973

[54] METHOD FOR STAMPING MODULATED GROOVES INTO INFORMATION CARRIERS

[75] Inventors: Herbert Knothe, Neumunster; Jürgen Buck, Nortorf; Heinz Borchard, Nortorf; Bruno Rybka, Nortorf, all of Germany

[73] Assignee: Teldec Telefunken-Decca Schallpatten GmbH, Hamburg, Germany

[22] Filed: Nov. 3, 1971

[21] Appl. No.: 195,133

[30] Foreign Application Priority Data

Nov. 3, 1970 Germany .................. P 20 53 837.8

[52] U.S. Cl. .................................. 72/376, 264/107
[51] Int. Cl. .......................................... B21k 23/00
[58] Field of Search .............................. 72/375, 376; 264/107

[56] References Cited

UNITED STATES PATENTS

| | | | |
|---|---|---|---|
| 3,442,990 | 5/1969 | Phillipson et al. | 264/107 |
| 3,072,519 | 1/1963 | Salzman | 264/107 |
| 3,052,586 | 9/1962 | Brown | 264/107 |

*Primary Examiner*—Lowell A. Larson
*Attorney*—George H. Spencer et al.

[57] ABSTRACT

Record copies are formed in a stamping operation in which no heat need be applied by employing a stamping pressure in excess of 1,000 kiloponds/cm².

8 Claims, 2 Drawing Figures

PATENTED JUL 24 1973 3,747,390

METHOD FOR STAMPING MODULATED GROOVES INTO INFORMATION CARRIERS

BACKGROUND OF THE INVENTION

The present invention relates to a stamping or pressing method for information carriers, particularly a method characterized by its rapidity.

It is known to mold thermoplastic sheets or discs by the application of pressure and heat and with the aid of stamping matrices, to fabricate information carriers, or record copies. The groove spirals contained in the stamping matrices have previously been formed, as is the custom for phonograph records, by frequency and amplitude modulation to represent an accurate mechanical reproduction of sound oscillations of all types exhibiting very different frequency spectra and amplitudes.

When duplicating such frequency and amplitude modulated recordings, it is important to not mechanically falsify, in the duplication process, the original modulation. According to conventional methods, a lacquer foil is first employed and a groove is cut into the lacquer surface with the aid of a recording machine, the groove walls being provided with undulations in the horizontal or vertical plan conforming with the oscillation modulation. The combination of two undulation directions perpendicular to each groove wall, or side, permits the stereophonic recording of two separate sound channels.

With expert handling of the recording and cutting apparatus it is possible in this way to obtain a record original containing a groove-type recording in the form of mechanical modulations which is true to the original sound and which is used for mechanical duplication. A negative is directly or indirectly obtained by galvanic means from this original which negative constitutes a stamper used to produce any desired number of copies in a stamping or pressing process. Since this negative consists of metal, for example electroplated nickel, it can withstand rather high pressures without difficulties, and can thus be considered to be a good, stable matrix. Even upon further galvanic duplications of this first negative, the first negative then being a master and the duplications usually called mother and stamper in the phonograph record art, the original modulation is not altered.

Matrices fabricated in this manner are today used to produce every phonograph record in the world. A pair of such matrices is clamped into a two-part pressing mold which can be heated and cooled; and thermoplastic materials are deformed in this mold under pressure and heat to form the resulting record copy.

It is also known to shorten the pressing cycle of the abovedescriped operation by using preformed discs of the thermoplastic material and by using the shortest possible pressing stroke time. Such a technique is disclosed, for example, in German laid open Application No. 1,504,166. Another shortening of the pressing cycle is possible by providing the preformed and cooled discs with grooves in a heatable mold as disclosed in, German laid open Application No. 1,504,618. Here the cooling is effected by the cold disc. The relatively small amount of heat provided by the matrices to melt the surface of the disc during the groove forming phase flows into the interior of the disc. Thus the cooling time is eliminated from the pressing cycle.

In another method, disclosed in German Published Pat. Application No. 1,188,312, the material is heated to a temperature which lies in its viscoelastic range while the matrix is continuously held at a lower temperature below the amorphous region of the material. According to this method, foil record discs are preferably produced in such a way that a preheating outside of the press, on the one hand, and the immediate cooling of the material by the matrices during the pressing reduces the stamping cycle to less than 3 seconds.

SUMMARY OF THE INVENTION

It is an object of the present invention to further simplify the pressing cycle by eliminating the temperature cycle during the stamping of the information carrier.

It is a more specific object of the present invention to provide a method for stamping a modulated groove spiral into an information carrier, possibly in foil shape, with the use of at least one stamping matrix, the method involving stamping the groove spiral with a stamping pressure of more than 1,000 kp (kiloponds)/$cm^2$. Kilopond is another term for kilogram of force, or kgf.

BRIEF DECRIPTION OF THE DRAWINGS

For a more complete understanding of the invention reference may be had to the following description taken in conjunction with the accompanying drawing, FIG. 1 is a graphic representation illustrating the above described conditions under high stamping pressure in relation to the temperature. The measured values indicating the temperature at which the information carrier can be successfully stamped.

FIG. 2 is an enlarged perspective view of the information carrier with modulated groove, the width of the groove is about 8 $\mu m$, the angle of pressure is about 150°.

DESCRIPTION OF THE PREFERRED EMBODIMENTS

Figure 1:
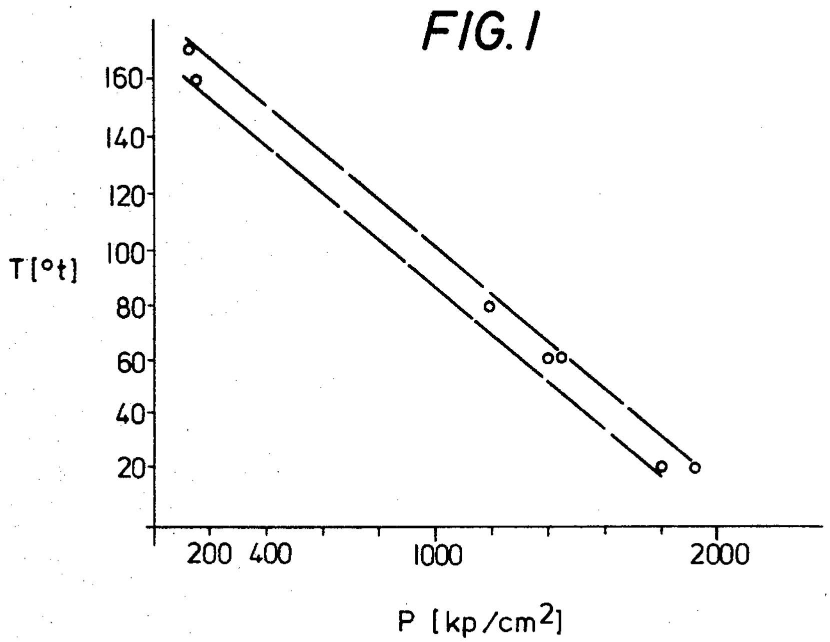

The invention is based on the rather surprising discovery, resulting from experiments, that the heat energy usually supplied as part of the molding process can be replaced by very high stamping pressures or kinetic energy. Especially in the molding of plastics, it has been found that a particularly favorable and high fidelity molding result is achieved using pressures of more than 1,000 kp/$cm^2$. In this pressure range the modulus of compression of the material increases more strongly. It is further thought that a downward shift of the glass transition temperature of the material occurs simultaneously.

Both facts indicate that in this range the bonds formed by the secondary Van der Waals forces have become so weak that the addition of purely mechanical energy is sufficient to produce a plastic deformation which faithfully reproduces the mold surfaces and thus that it is possible to effect a plastic deformation below the original amorphous range of the material.

In particular, the method according to the present invention offers the advantage that a plastic deformation to form a modulated groove spiral is possible without the occurrence of stresses in the material when it is in its deformed state, which stresses must be considered when the processing of the material involves a temperature cycle. The danger of stresses occurring in a temperature cycle after the cooling process is thus eliminated.

Based on this knowledge it is possible to effect molding without temperature cycles and to obtain an even more favorable effect than possible in the present state of the art, where the only known methods either wholly or in part require the addition of heat energy and thus include either a complete or a shortened temperature cycle.

In further processing, the method of the present invention can be applied to many different kinds of materials. Many possibilities are offered by the broad field of multiple layer materials, or laminates, such as, for example, combinations of plastics or similar nonmetallic materials with metals, or combinations of different nonmetallic materials. In certain cases it has proven to be advantageous to stamp the groove spiral into an information carrier which has a metallic surface. In the case of a duroplastic material, the groove spiral is advantageously stamped without the addition of heat energy under a high pressure of more than 1,500 kp/cm². For stamping settable or polymerizable plastics, a pressure of more than 1,000 kp/cm² is advisable.

The application of the required pressure, which far exceeds the level previously applied for stamping plastics, particularly for information carriers, can be effected, for example, between two rotating rollers. Since temperature varying stages, or phases are no longer necessary, the stamping can be effected in a very short time. With this method stamping times of less than a second can be attained without difficulties. This means that rotary pressing, i.e., a continuous process, thus becomes possible.

A further possibility to arrive at a short-time hydrostatic pressure of more than 1,000 kp/cm² in the stamping foil lies in the use of kinetic energy to produce impacts which create the required stamping pressure. This leads to a very rapid stamping procedure which, however, cannot be carried out in a strictly continuous manner. As shown in FIG. 1 a PVC-foil preferably made of unplasticized suspension polymerisate can be sufficiently stamped at a temperature in the range below the glass transition temperature if the stamping pressure is high enough. More complete details on the meaning of the words "glass transition temperature" can be found in "Ullmanns Encyklopadie der technischen Chemie, Verlag Urban & Schwarzenberg, Muenchen — Berlin — Wien," 18.Bd.,page 541/542.

Figure 2:
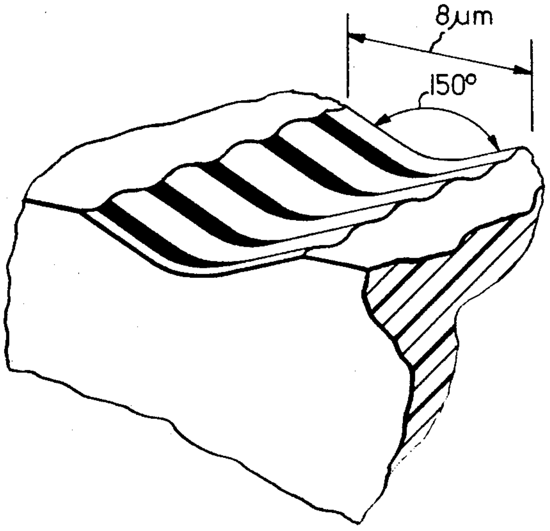

The stamping of a mechanically modulated groove of the dimensions shown in FIG. 2 is poosible e.g., at a stamping temperature of 80 °C and at a specific stamping pressure of 1,100 kp/cm²; but also at a stamping temperature of 20 °C and a specific stamping pressure of 1,800 kp/cm². The exact copy corresponding to the originally recorded modulation will be attained in both cases.

The measured values, existing between the lines represented in FIG. 1, demonstrate the point where the impressed modulation can be designated as precise.

The measured values begin at the conditions as they are customary with manufacturing of records — e.g., 160 °C temperature and 160 kp/cm² pressure — and they end at ambient temperature.

When use is made of samples of PVC-foils, the application of adequately high pressures permits the stamping to be effected below glass transition temperature — that means between 60 °C and 20 °C —, permitting complete elimination of the hitherto usual temperature cycle and enabling the stamping to be performed with a constant temperature in the foil as well as in the matrices.

It will be understood that the above description of the present invention is susceptible to various modifications, changes and adaptations, and the same are intended to be comprehended within the meaning and range of equivalents of the appended claims.

We claim:

1. A method for stamping a modulated groove in spiral form into an information carrier of a moldable material by means of a stamping matrix carrying a replica of such groove, comprising applying the matrix against a body of the material with a stamping pressure of greater than 1,000 kp/cm²and, prior to and during said step of applying, preventing the application of heat from outside the region in which the material is stamped.

2. A method as defined in claim 1 wherein the material is a thermoplastic, a settable plastic, or a polymerizable plastic.

3. A method as defined in claim 1 wherein the material is a duroplastic and said step of applying is carried out with a stamping pressure of greater than 1,500 kp/cm².

4. A method as defined in claim 1 wherein the body of material has a metallic surface.

5. A method as defined in claim 1 wherein the groove sprial is stamped into a multilayer material.

6. A method as defined in claim 1 wherein said step of applying is carried out by passing the body of material between two rotating rollers which apply the stamping pressure and one of which carries the stamping matrix.

7. A method as defined in claim 1 wherein said step of applying is carried out by causing the stamping matrix to impact against the body of material.

8. A method as defined in claim 1 wherein said step of applying forms the body into a phonograph record disc.

* * * * *